United States Patent [19]
Berg et al.

[11] 3,873,166
[45] Mar. 25, 1975

[54] SEALED SELF-ADJUSTING BEARING

[75] Inventors: Lawrence F. Berg, Lockport; Peter F. M. Prillinger, Decatur, both of Ill.

[73] Assignee: Caterpillar Tractor Company, Peoria, Ill.

[22] Filed: Apr. 18, 1973

[21] Appl. No.: 352,502

[52] U.S. Cl.................. 308/36.1, 277/183, 308/72
[51] Int. Cl..... F16c 23/08, F16c 33/74, F16j 15/32
[58] Field of Search............ 308/36.1, 72; 277/181, 277/183

[56] References Cited
UNITED STATES PATENTS

| | | | |
|---|---|---|---|
| 2,259,648 | 10/1941 | Lucas................................ | 308/36.1 |
| 2,308,613 | 1/1943 | LeTourneau....................... | 403/51 |
| 2,518,338 | 8/1950 | Lampe................................ | 308/72 |
| 2,711,352 | 6/1955 | Hasko et al........................ | 308/72 |
| 3,347,577 | 10/1967 | Carlson et al..................... | 308/72 X |
| 3,506,315 | 4/1970 | Young, Jr........................... | 308/72 |
| 3,554,588 | 1/1971 | Reinsma et al................... | 305/58 X |
| 3,588,201 | 6/1971 | Schmidt............................. | 308/36.1 |
| 3,588,201 | 6/1971 | Schmidt............................. | 308/36.1 |
| 3,680,924 | 8/1972 | Otto et al.......................... | 305/11 |

Primary Examiner—M. Henson Wood, Jr.
Assistant Examiner—Howard Beltran
Attorney, Agent, or Firm—Phillips, Moore, Weissenberger, Lempio & Stabala

[57] ABSTRACT

An outer bearing race is mounted in a bore defined in a support member and an inner bearing race is universally mounted in the outer race to form a ball and socket connection therebetween. An annular retainer is secured in the bore on each side of the outer race to seat and retain an annular lip seal therebetween. A flexible lip of the seal extends radially inwardly into sealing contact with a convex spherical surface formed on the inner race.

10 Claims, 3 Drawing Figures

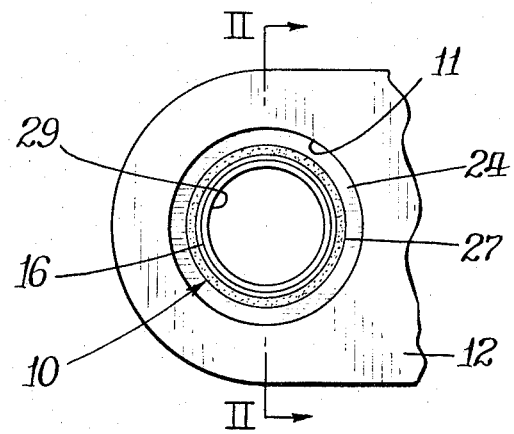
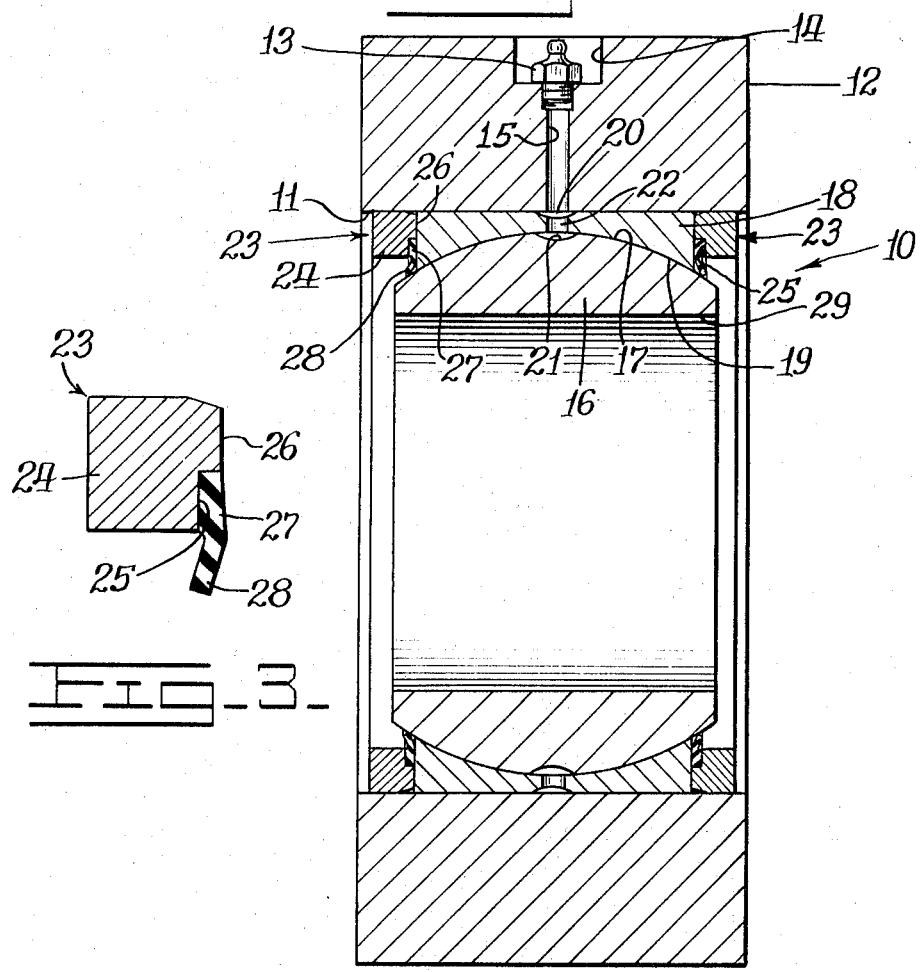

SEALED SELF-ADJUSTING BEARING

BACKGROUND OF THE INVENTION

Ball and socket connections, employing spherically-shaped self-aligning bearings, are commonly employed for pivotally mounting the ends of a hydraulic cylinder on an earthworking vehicle. Such vehicles are exposed to adverse environments which tend to wear the bearings excessively. The bearings are oftentimes "permanently" lubricated and sealed to aid in increasing the life expectancy thereof.

For example, various bearing materials such as oil-impregnated sintered metal and Teflon-coated phenolics may be employed in such bearing applications. Such materials are normally incapable of withstanding the high loads imposed thereon when used in heavy-duty earthworking applications. In addition, conventional ball and socket connections are generally difficult to assemble and disassemble for repair purposes. Examples of such connections are disclosed in U.S. Pat. Nos. 2,308,613; 2,711,352; 3,347,577; 3,506,315; 3,554,588; 3,588,201; and 3,680,924.

SUMMARY OF THIS INVENTION

An object of this invention is to overcome the above, briefly described problems by providing an economical and non-complex sealed ball and socket connection which is adapted for expeditious assembly and disassembly and long service life. The ball and socket connection comprises an inner race having a convex spherical surface formed thereon and an outer race, mounted in a bore of a support member, having a concave spherical surface universally mounted on the convex spherical surface of the inner race. A combined sealing and retaining means is disposed on each lateral side of the outer race and includes an annular retainer secured within the bore, an annular recess formed on an inboard side of the retainer and an annular lip seal secured in the recess between the outer race and the retainer. A flexible lip of the seal extends radially inwardly into sealing contact with the convex spherical surface of the inner race.

BRIEF DESCRIPTION OF THE DRAWINGS

Other objects of this invention will become apparent from the following description and accompanying drawings wherein:

FIG. 1 is a side elevational view of an end of a hydraulic cylinder having a sealed ball and socket connection of this invention mounted therein;

FIG. 2 is an enlarged sectional view of the ball and socket connection, taken in the direction of arrows II—II in FIG. 1; and FIG. 3 is an enlarged cross sectional view of a combined sealing and retaining means employed in the ball and socket connection.

DETAILED DESCRIPTION

FIG. 1 illustrates a sealed ball and socket connection 10 mounted in a bore 11 formed transversely through a support member 12. The support member may comprise the head or rod end of a hydraulic cylinder, for example, employed in an earth-working vehicle such as a hydraulic excavator. As shown in FIG. 2, lubrication means comprises a grease fitting 13 which is threadably mounted in a recess 14, formed on the support member to normally close a radial fill passage 15.

The ball and socket connection comprises an inner race 16 having a convex spherical surface 17 formed exteriorly thereon. An outer race 18 is slidably mounted in bore 11 and has a concave spherical surface 19 formed internally thereon to substantially conform to surface 17 to provide a self-aligning bearing contact therebetween. Fill passage 15 is adapted to communicate lubricant, such as grease or oil, to a first annular groove 20 formed on the outer periphery of the outer race and thence to a second annular groove 21 formed on the outer periphery of the inner race via a plurality of circumferentially spaced ports 22.

A combined sealing and retaining means 23 is disposed on each lateral side of the outer race to prevent axial displacement of the races, relative to support member 12, and to prevent loss and contamination of the sealed lubricant. Such means includes an annular retainer 24 of rectangular cross section press-fitted or otherwise suitably secured within bore 11 to have a flat inboard sidewall 26 thereof abut a respective flat outboard sidewall of the outer race. An annular recess 25 is formed on the retainer's inboard sidewall to extend radially inwardly towards the inner race.

An annular lip seal 27 of means 23 may be suitably disposed in the recess and bonded to the retainer by a suitable adhesive. As shown in FIG. 3, the inboard sidewall of the seal is substantially flush with inboard sidewall 26 of the retainer to compress the seal between the retainer and outer race 18 to aid in positive securance thereof in the ball and socket connection (FIG. 2). The lip seal comprises a flexible lip 28 which extends radially inwardly below the retainer and into sealing and wiping contact with convex spherical surface 17 of the inner race. The inner race has a bore 29 formed transversely therethrough, adapted to mount support member 12 on a pivot shaft or the like (not shown).

Upon installation of each retainer 24 and lip seal 27 into bore 11, it should be noted that flexible lips 28 of the seals will inherently flex outwardly under a predetermined preload to continuously maintain their sealing contact with surface 17. Thus, a continuous wiping action against such surface will function to dislodge foreign particles and material therefrom and will prevent the loss of lubricant therepast. The seals preferably comprise a polyurethane material or the like which exhibits a high resistance to tear and abrasion and further exhibits a high modulus of elasticity and elastic memory.

What is claimed is:

1. A sealed ball and socket connection mounted in a bore formed in a support member comprising
    an inner race having a convex spherical bearing surface formed exteriorly thereon,
    an outer race, mounted in said bore, having a concave spherical bearing surface formed internally thereon to substantially conform to said convex spherical bearing surface and universally mounted thereon, and
    a combined sealing and retaining means disposed on each lateral side of said outer race including an annular retainer secured within said bore, annular recess means solely formed on an inboard side and radially inner corner of said retainer to extend to a limited depth axially in said retainer and to a limited depth radially outwardly from said inner race and an annular lip seal disposed in said recess and clamped axially between said outer race and said retainer and having a flexible lip extending radially inwardly substantially past said retainer and into sealing contact with the convex spherical bearing surface of said inner race.

2. The ball and socket connection of claim 1 wherein said support member constitutes a hydraulic cylinder.

3. The ball and socket connection of claim 2 further comprising a bore formed transversely through an end of said cylinder adapted to receive a pivot shaft therein for mounting said cylinder on a vehicle.

4. The ball and socket connection of claim 1 further comprising lubrication means for continuously communicating lubricant between said convex and concave spherical bearing surfaces.

5. The ball and socket connection of claim 4 wherein said lubrication means comprises a fill passage formed radially through said support member and a fitting normally closing said passage.

6. The ball and socket connection of claim 5 wherein said lubrication means further comprises a first annular groove formed on the outer periphery of said outer race, a second annular groove formed on the outer periphery of said inner race and a plurality of circumferentially spaced ports formed in said outer race to communicate said first and second grooves with each other.

7. The ball and socket connection of claim 1 wherein each of said retainers has a generally rectangular cross section and a flat, annular inboard sidewall abutting a respective flat, annular outboard sidewall of said outer race.

8. The ball and socket connection of claim 7 wherein an inboard sidewall of said seal, between said outer race and said retainer, is substantially flush with respect to the inboard sidewall of said retainer.

9. A sealed ball and socket connection mounted in a bore formed in a support member comprising an inner race having a convex spherical bearing surface formed exteriorly thereon, an outer race, mounted in said bore, having a concave spherical bearing surface formed internally thereon to substantially conform to said convex spherical bearing surface and universally mounted thereon, and a combined sealing and retaining means disposed on each lateral side of said outer race including an annular retainer secured within said bore, annular recess means formed on an inboard side of said retainer to extend radially inwardly toward said inner race and an annular lip seal disposed in said recess between said outer race and said retainer and having a flexible lip extending radially inwardly into sealing contact with the convex spherical bearing surface of said inner race, each of said retainers having a generally rectangular cross section and a flat, annular inboard sidewall abutting a respective flat, annular outboard sidewall of said outer race and an inboard sidewall of said seal, between said outer race and said retainer, and the inboard sidewall of said seal being disposed substantially flush with respect to the inboard sidewall of said retainer.

10. The ball and joint connection of claim 9 wherein said lip seal is secured to said retainer.

* * * * *

UNITED STATES PATENT OFFICE
CERTIFICATE OF CORRECTION

PATENT NO. : 3,873,166
DATED : March 25, 1975
INVENTOR(S) : Lawrence F. Berg, et al It is certified that error appears in the above-identified patent and that said Letters Patent are hereby corrected as shown below:

On the Title Page, Item [75], change the spelling of the inventor's first name from "Lawrence" to --- Lawrance ---.

Signed and Sealed this twenty-second Day of July 1975

[SEAL]

Attest:

RUTH C. MASON
Attesting Officer

C. MARSHALL DANN
Commissioner of Patents and Trademarks

UNITED STATES PATENT OFFICE
CERTIFICATE OF CORRECTION

PATENT NO. : 3,873,166
DATED : March 25, 1975
INVENTOR(S) : Lawrence F. Berg, et al It is certified that error appears in the above—identified patent and that said Letters Patent are hereby corrected as shown below:

On the Title Page, Item [73], change the spelling of the assignee's corporate name from "Caterpillar Tractor Company" to --- Caterpillar Tractor Co. ---.

Signed and Sealed this

Third Day of August 1976

[SEAL]

Attest:

RUTH C. MASON
*Attesting Officer*

C. MARSHALL DANN
*Commissioner of Patents and Trademarks*